United States Patent
Suzuki et al.

(10) Patent No.: US 7,090,564 B2
(45) Date of Patent: Aug. 15, 2006

(54) POLISHING SOLUTION AND METHOD OF POLISHING NONFERROUS METAL MATERIALS

(75) Inventors: Youichiro Suzuki, Hirakata (JP); Satoru Arita, Hirakata (JP); Hirokazu Fukui, Hirakata (JP); Kazuyo Tsuchiya, Hirakata (JP)

(73) Assignee: C. Uyemura & Co., Ltd., Osaka (JP)

(*) Notice: Subject to any disclaimer, the term of this patent is extended or adjusted under 35 U.S.C. 154(b) by 0 days.

(21) Appl. No.: 11/015,323

(22) Filed: Dec. 20, 2004

(65) Prior Publication Data

US 2005/0136805 A1   Jun. 23, 2005

(30) Foreign Application Priority Data

Dec. 22, 2003  (JP)  ............................. 2003-424726

(51) Int. Cl.
*B24B 1/00* (2006.01)
(52) U.S. Cl. ............................ 451/36; 451/559; 451/60
(58) Field of Classification Search ................ 451/36, 451/41, 28, 60, 51, 63, 446, 559; 51/307–309; 438/691–693; 216/88–90

See application file for complete search history.

(56) References Cited

U.S. PATENT DOCUMENTS

| | | | |
|---|---|---|---|
| 6,530,824 B1 * | 3/2003 | Thomas et al. | 451/41 |
| 6,783,432 B1 * | 8/2004 | Li et al. | 451/36 |
| 2004/0172886 A1 * | 9/2004 | Grunwald | 51/307 |
| 2004/0226915 A1 * | 11/2004 | Ono et al. | 216/83 |

FOREIGN PATENT DOCUMENTS

| | | |
|---|---|---|
| JP | 2000-119638 | 4/2000 |
| JP | 2001-68437 | 3/2001 |

* cited by examiner

*Primary Examiner*—Dung Van Nguyen
(74) *Attorney, Agent, or Firm*—Oblon, Spivak, McClelland, Maier & Neustadt, P.C.

(57) ABSTRACT

A polishing solution, comprising copper ions and chloride ions in Cu/Cl molar ratio of $10^{-1}$ to $10^3$ and at pH 0.5 to 10, is suited for polishing a surface composed of a nonferrous metal material such as copper or copper alloy. Thicker metal film can be polished at high removal rate, so that distribution in film thickness becomes uniform.

20 Claims, 3 Drawing Sheets

POLISHING SOLUTION AND METHOD OF POLISHING NONFERROUS METAL MATERIALS

CROSS-REFERENCE TO RELATED APPLICATION

This non-provisional application claims priority under 35 U.S.C. §119(a) on Patent Application No. 2003-424726 filed in Japan on Dec. 22, 2003, the entire contents of which are incorporated herein by reference.

TECHNICAL FIELD

The present invention relates to a polishing solution and a method of polishing nonferrous metal materials including bulk metal substrates of copper or copper alloys (e.g., brass), substrates layered with foils of copper or copper alloys, and substrates on which copper or copper alloy is deposited by plating technique and others.

BACKGROUND ART

In polishing thick substrates of nonferrous metal materials, the technical requirements for the polishing are that the uniformity of film thickness distribution can be imparted to the polished surface for a short time (in case of rough surface, similar roughness is needed in the whole surface).

In general, on nonferrous metal substrates, mechanical polishing using lathe or plane machines has been employed. Such a polishing technique results in a rough and non-uniform distribution of film thickness for the surface, although achieving desirabilities of the polished surface for a short time.

On the other hand, in manufactures of semiconductor such as ULSI and others, where surface planarization is of more importance and a high finishing precision is necessary, the key technology is chemical mechanical polishing (CMP). The CMP technique, which combines chemical etching with mechanical polishing, creates formation of wiring line as small as several tens of nanometers on the semiconductor. That is, in the semiconductor fabrication, the CMP is considered to be the basic in order to form circuit construction in a semiconductor surface. In the CMP technology for the semiconductor manufacturing, by physical vapor deposition (PVD), chemical vapor deposition (CVD) or plating, a thin film is formed on the surface of silicon substrate and the global planarization can be accomplished to the thin film in order to remove the excess part of the thin film which is unnecessary for circuit formation. The technology aims at planarizing globally the thin film, and hence the removal rate is about 100 nm/min at the maximum. In many cases, abrasives such a colloidal silica or an alumina, etc., is compounded in a polishing solution to obtain the polishing effect of the abrasives, and then the CMP process proceeds with the interaction between mechanical polishing and chemical etching, as disclosed in JP-A 2001-68437. Thus, removal of the coherent abrasives particles results in complicated operations in a water rinse process. On the other hand, for materials with highly corrosion resistance, e.g., stainless steel, the CMP technology is applied to mirror-processed planaraization to prevent light from reflecting diffusely: convex mirror used as safety confirmation on the road and mirror-finished panel used as construction parts.

However, in the semiconductor fabrication, e.g., ULSI, the deposited metal film of about 100 nm in thickness has to be globally planarized with the surface roughness of 100 nm or less (the 50 nm roughness at the maximum for the semiconductor), and hence the removal rate lower than 500 nm/min enables the CMP to be controlled. The fact that the metal film is about 100 nm in thickness is difficult to control the CMP because the high removal rate promotes the progress in the polishing so that the film may disappear from the surface.

On the other hand, in the case of the polishing for tungsten film, the CMP technology is also applied. As described in JP-A 2000-119638, the removal rate of about 500 nm/min is required, but a removal rate that is required in the technical region of the present invention cannot be achieved.

SUMMARY OF THE INVENTION

The purpose of the present invention is to provide a polishing solution and a method of polishing nonferrous metal materials. The technology in the present invention achieves to polish a substrate of a film with thicker thickness at a higher speed of 0.5 to 10 μm/min during the polishing for copper or copper alloys, and then the thickness distribution on the polished surface becomes uniform.

To accomplish the above purpose, a polishing solution obtained from the present invention is a kind of a mechanical polishing solution used for nonferrous metal materials, where di- and/or mono-valent copper ions and chloride ions are contained. When copper or copper alloys are chemically polished in the polishing solution, copper chloride film is formed on their surface at noble potential in the presence of chloride ions. Consequently, oxidation of copper is promoted, namely dissolution proceeds. In this case, if Cu/Cl molar ratio ranges from $10^{-1}$ to $10^3$, rest potential at metal/polishing solution interface extends at potential from activated region to passive region. Therefore, the chemically stable dissolution of the metal substrate is promoted. To polish mechanically with a polishing machine equipped with pad, the interaction between the chemically promoted dissolution and the mechanically polishing effect increases removal rate in polishing solution. The metal substrate can be polished with minimizing the deviation of film thickness distribution.

Thus, a polishing solution and a method of polishing nonferrous metal materials are provided as the followings.

The first aspect of the present invention provides a polishing solution where a substrate surface composed of a nonferrous metal material such as copper or copper alloy is polished, and where mono- and/or di-valent copper ions and chloride ions are contained in the Cu/Cl molar ratio range of $10^{-1}$ to $10^3$ and at pH of 0.5 to 10.

Furthermore, the second aspect of the present invention provides the polishing solution where the free-abrasives can be dispersed.

In addition, the third aspect of the present invention provides the polishing solution into which a corrosion inhibitor can be added.

The fourth aspect of the present invention provides the polishing solution which is used by the method of polishing a substrate surface being pressed on a polishing pad to polish the surface.

The fifth aspect of the present invention provides the polishing solution is used by the following method: the polishing pad which is set on the polishing machine allows rotational or reciprocating motion, and the polishing solution is supplied for the polishing pad and the substrate surface to press the substrate on the pad.

The sixth aspect of the present invention provides a polishing method of nonferrous metal materials: a polishing solution, where mono- and/or di-valent copper ions and chloride ions are contained in the Cu/Cl molar ratio range of $10^{-1}$ to $10^3$, and a polishing pad are used, and, by pressing the substrate material on the pad, the substrate surface is polished because of the interaction between mechanical polishing of the pad and chemical dissolution of the polishing solution.

The seventh aspect of the present invention provides the polishing method of nonferrous metal materials: the polishing pad is set on the polishing machine capable for the rotational or reciprocating motion, and the polishing solution is supplied for the polishing pad and the substrate surface in order to polish the surface by pressing the materials on the pad having the rotational or reciprocating motion.

The eighth aspect of the present invention provides the polishing method of nonferrous metal materials: the polishing pad has a Young modulus of 5 to 100 $g/cm^2$ and a tensile strength of 10 $kg/cm^2$ or less.

The ninth aspect of the present invention provides the polishing method of nonferrous metal materials: the polishing pad has porous surface or orthogonal surface trench.

The tenth aspect of the present invention provides the polishing method of nonferrous metal materials: the polishing pad is rotated at a speed of 1 to 5,000 rpm.

The eleventh aspect of the present invention provides the polishing method of nonferrous metal materials: the polishing pad is pressed against the substrate surface under a pressure of 10 to 1,000 $g/cm^2$.

The twelfth aspect of the present invention provides the polishing method of nonferrous metal materials: the polishing pad supported abrasives particles can be used to polish the surface.

The thirteenth aspect of the present invention provides the polishing method of nonferrous metal materials: abrasives are dispersed in the polishing solution as slurry.

Herein, the soft material polishing pad, having a Young modulus of 5 to 100 $g/cm^2$ or a tensile strength of 10 $kg/cm^2$ or less, allows the distribution of film thickness on the polished surface to become uniform because the pad can follow a concave or a convex formed on the surface.

Moreover, porous surface or orthogonal surface trench, which are formed on the polishing pad, helps the polishing solution to be supplied uniformly in the whole surface, and then the slurry avoids concentrating on the material surface.

Rotational speed of 1 to 5,000 rpm promotes oxidation of the substrate material by agitating the solution, and hence chemical dissolution proceeds consequently. In addition, in the case of the slurry solution (containing abrasives), the abrasives assist the surface polishing.

By generating heat under a polishing pressure of 10 to 1,000 $g/cm^2$, the temperature of the polishing solution rises, and then chemical dissolution proceeds. In addition, the pressure range usually prevents the substrate from being deformed.

The polishing rate notably increases when the polishing pad supported abrasives or the slurry solution (abrasives contained in the polishing solution) is used. The method to feed the solution is as follows: a method of feeding directly the pad with the polishing solution, a method of feeding the polishing solution directly to the substrate, and a method of setting the substrate in a vessel filled with the polishing solution in order to polish the surface with the pad, and others.

The present invention provides a processing method of the metal substrate: processed precision is improved in the thickness direction of the substrate. Such a processing method for the substrate is hardly proposed from the traditional viewpoint of metal processing. On the other hand, in the conventional chemical mechanical polishing (CMP) technology, removal rate of the metal (or the film) ranges from 10 to 20 nm/min. Such a low removal rate prolongs the removal time to polish the metal (or the film) of several micron meters and becomes disadvantage economically. The present invention provides high removal rate, at least 500 to 10,000 nm/min (0.5 to 10 µm/min), during the CMP, and then the thickness distribution of the metal (or the film) with planarizing the surface is controlled in the order of micron meter. That is, the CMP is conducted by using the polishing solution obtained from the present invention. Consequently, under the polishing conditions shown in the present invention, the substrate surface of metal materials can reduce the film by a certain thickness with planarizing the surface. Therefore, the dimensional accuracy in the thickness direction of the substrate can be controlled on the order of micron meters. The present invention is categorized as a the mechanical processing technology for processing the thickness of the substrate by the CMP technique, and the purpose of the CMP provided by the present invention is different from that in semiconductor manufacture.

According to the polishing method of nonferrous metal materials shown in the present invention, the substrate of the thick thickness can be polished at a high removal rate, furthermore thickness distribution becomes uniform.

DESCRIPTION OF THE PREFERRED EMBODIMENTS

Potential metal materials to be polished by the present invention are nonferrous metal materials, which are typically copper and copper alloys, but a limit is not put to such materials. Cu—Zn and Cu—Sn etc. can be shown as appropriate alloys. Cu content in the alloy is at least 50% or more by weight, especially Cu content of 70% or more by weight is preferable.

In addition to the thickness control of bulk metal substrates, the processing method obtained from the present invention is applicable to the thickness control of the metal film which is formed on the substrate by layering foil or plating, etc. And the technique in the present invention is applied to both conductive and non-conductive substrates.

In the present invention, to polish a substrate surface, composed of nonferrous metal material which is described in the above, the polishing solution containing copper ions and chloride ions is used. That is, in order to cause chemical etching with high efficiency, copper ions (mono- and/or di-valent) and chloride ions as crucial constituents have to be contained in the polishing solution. Their concentrations are 0.01 M or more, preferably 0.01 to 3 M, respectively. Moreover, Cu/Cl molar ratio ranges from $10^{-1}$ to $10^3$, preferably from $10^{-1}$ to $10^2$. The range ensures that effective chemical mechanical polishing takes place.

Low ionic concentration causes great variation in composition of the polishing solution, indicating that the practical solution control is impossible. Such a molar ratio stagnates rest potential at a certain potential from active region of the metal to passive region. Thus, the molar ratio acts as chemical potentiostat (the rest potential is determined by composition ratio of chemical species, and hence the composition ratio substantially corresponds to polarization effect which is obtained from the connection to an electric power supply). As a result, passivation takes place with promoting chemical dissolution. Chemical dissolution cannot occur at Cu/Cl molar ratio below $10^{-1}$, and then the polishing in the present invention is principally governed by mechanical polishing. On exceeding Cu/Cl molar ratio of $10^3$, the CMP is possible but wastewater treatment etc. are not preferable.

The polishing solution contains at least copper ions and chloride ions in the previous molar ratio. To provide such a molar ratio, copper salts of mineral acid, e.g., copper chloride and copper nitrate, and copper salts of organic acid, e.g., copper acetate, can be used as a source of copper ions. Hydrochloric acid, sodium chloride, potassium chloride, etc. can be used as a source of chloride ions. Moreover, in order to adjust the solution pH, mineral acids, e.g., sulfuric acid, nitric acid and hydrochloric acid, and organic acids, e.g., formic acid, acetic acid and lactic acid, can be used.

In order to cause chemical etching with great efficiency, preferable pH ranges from 0.5 to 10, and metal materials dissolved during the CMP in the present invention have to exist stably in the polishing solution. Specifically, optimum pH choice of the polishing solution, where ionic species of the polished metal become stable thermodynamically, is recommended. Potential-pH diagram is drawn from the thermodynamical data of chemical species which constitute the polished metal and the polishing solution, and then the optimum solution pH range can be determined. When the inventive polishing method is carried out in the desired pH range, a removal rate of at least 0.5 μm/min can be accomplished. If dissolved metal ions are unstable in the polishing solution, complexing agents can be added. Taking the complexing reaction into consideration, the pH range can be determined from potential-pH diagram. However, if the polishing solution is held at pH below 0.5 or above 10, the materials constricting the apparatus and the pad are restricted, and then economic disadvantages may occurs.

Another effective procedure to bring about chemical etching with high efficiency is the application of oxidizing agent. The preferable choice of the oxidizing agent must take environmental problem into consideration. Oxygen and/or hydrogen cathode reactions are available for the reaction of oxidizing agent. In the case of oxygen cathode reaction, the polishing solution can be forcibly aerated as the source of dissolved oxygen. The cathode reaction of dissolved oxygen proceeds through hydrogen peroxide as an intermediate. Therefore, although hydrogen peroxide may be directly added into the polishing solution, decomposition of hydrogen peroxide increases the consumption and is economically undesirable. However, dissolved oxygen concentration in the polishing solution is governed by the Henry low, and the oxygen is dissolved into the solution so as to come to equilibrium with atmosphere. To keep the dissolved oxygen concentration constant, there are two methods: the vigorous agitation or direct aeration of the polishing solution in the storage tank. With hydrogen cathode reaction utilized for the oxidizing agent, acids, etc., (e.g., mineral acid) have to be replenished to control the solution pH. When hydrogen cathode reaction is utilized for the oxidizing agent, the polishing liquid is kept at pH 4 or less, desirably pH 3 or less. The solution pH above 4 inhibits the hydrogen cathode reaction because of lower proton concentration. Catalytic activity is dependent on polished metal materials, and hence the activity of oxygen cathode reaction is different from that of hydrogen cathode reaction. Thus, the pH range where either of the two reactions takes place necessarily has to be chosen. The desired pH range is from 1 to 4, and preferably from 1 to 3.

To promote passivation of chemically etched surface, a corrosion inhibitor is preferably added. The corrosion inhibitor forms a passive film on the chemically etched metal surface to inhibit local corrosion such as pitting corrosion. The concentration of the corrosion inhibitor in the polishing solution ranges from 0.0001 to 10% by weight, preferably from 0.001 to 1% by weight. Substantial corrosion inhibition effect cannot be accomplished at lower inhibitor concentration than 0.0001% by weight, while, at higher concentration than 10% by weight, the removal rate drops to promote excessively the passivation. Moreover, the polishing solution becomes unstable. Economical restriction, also, exists because corrosion inhibitors are generally expensive.

Hydrocarbon-derived nitrogen-containing compounds, hydrocarbon-derived sulfur-containing compounds and hydrocarbon-derived oxygen-containing compounds can be used as corrosion inhibitors, and cyclic conjugated hydrocarbons containing nitrogen, oxygen or sulfur compounds can be preferably used. Concrete examples of the inhibitor is as follows: alkylamines with 8 to 12 carbon atoms ($C_nH_{2n+1}NR_2$ wherein R is H, OH and/or $CH_3$), alkenylamines with 3 to 4 carbon atoms such as $CH_2=CHCH_2CH_2NH_2$ and $CH_3CH=CHCH_2NH_2$, aniline derivatives such as aniline and hydroxyaniline, hydrazine and hydrazine derivatives, benzotriazole derivatives such as benzotriazole and 5-benzyl-1,4-triazole-3-thion, quinoline derivatives such as quinoline, isoquinoline, nitroquinoline and hydroxyquinoline, indole and indole derivatives, imidazole derivatives such as imidazole and 2-mercaptanbenzimidazole, thiocarbon derivatives such as thiourea, furan derivatives such as furan and hydroxyfuran, pyrrole derivatives such as pyrrole, nitropyrrole and hydroxypyrrole, phenol derivatives such as methylphenol and nitrophenol, monosaccharides such as glucose and fructose.

Once the surface, where the passive film is formed, is removed by mechanical polishing, the highly chemical active surface is regenerated. Then, the regenerated surface undergoes chemical etching and is re-passivated. As such cycles proceed, the metal surface can be polished.

The passive film can be removed by using the slurry solution (abrasives are dispersed in the solution) or by using the pad where abrasives are supported. In the present invention, both methods can be applied to the polishing of metal substrates. However, in order to improve detergent ability after CMP, it is proper to perform the CMP with using the abrasives-free polishing solution and the abrasives-supported pad. The free-abrasives or the fixed-abrasives have the averaged particulate size in the range of 0.01 to 50 μm in diameter, preferably 0.05 to 20 μm. With using averaged particle diameter below 0.01 μm, highly removal rate cannot be fully attained. Abrasives of averaged particle diameter larger than 50 μm causes deep scratches in the metal surface. Abrasives can be used as follows: $Al_2O_3$, $SiO_2$, composite oxides of $Al_2O_3$ and $SiO_2$, SiC, zirconia, selenium oxide, and diamond slurry, etc. The abrasives are composed of the single or the mixture of the foregoing compounds. In the case of the free abrasives, the concentration in the polishing solution ranges from 1 to 50% by weight, preferably 5 to 40% by weight. At concentration of the abrasives lower than 1% by weight, removal rate is as fast as about 0.05 μm/min, which is impractical. At concentration of the abrasives higher than 50% by weight, the solution dispersing abrasives cannot become slurry to form the paste. It is noted that the average particle diameter is measured as weight-averaged value with particle size analyzer, e.g., laser scattering size distribution analyzer, etc.

For the polishing method in the present invention, polishing machine which equipped with polishing pad can be used. Choice of polishing pads becomes more important in providing a uniform amount of removal mass. The polishing pad must have excellently flexible material characteristics, and then it is proper to have the following physical value shown representatively in the Young modulus and tensile strength. The value is as follows: the Young modulus of 5 to 100 g/cm$^2$, more preferably 5 to 90 g/cm$^2$, and tensile strength of up to 10 kg/cm$^2$, more preferably 3 to 10 kg/cm$^2$. When a pad with such physical values is used during the polishing, the pad can follow the minute concave and convex formed on the surface so that the protrusion can be removed and the thickness of the substrate can become uniform. It is noted that the Young modulus and tensile strength are specified in JIS K7244, L1069, K6404 and K7162.

Appropriate materials for the polishing pad is as follows: wool, cashmere, nylon, polyester and stainless steel wool, sponges, flexible urethane nonwoven fabrics, nylon nonwoven fabrics, and polyvinyl alcohol (PVA) molded parts. Moreover, the previous pad can be used to coat the pad surface with abrasives.

The surface of pads used in the present invention is proper to form the porous or the orthogonal trench shape. If different shaped pad is used, some difficult problems take place as follows: to be unable to supply uniformly the polishing solution fed from the inlet to the whole substrate surface, removal mass becomes non-uniform; uniform thickness cannot be attained. In some cases, the polishing solution can act as a lubricant so as to reduce the removal rate. During the CMP with the slurry solution, the foregoing shapes of the pad effectively avoid concentrating abrasives at metal surface/solution interface.

Polishing conditions as prescribed by the present invention play an important role: mechanical polishing effect is superimposed on chemical polishing effect (etching effect). The polishing solution from the feed inlet (the feed box) which is set near rotating shaft on the polishing machine is supplied to the whole pad. In the present polishing method, chemical etching is mass transfer reaction, and hence the rotational number of the pad and the feed speed of the polishing solution govern mass transfer rate to the polished surface. The mass transfer is represented by the non-dimensional parameters of Reynolds number (Re), Sherwood number (Sh) and Schmidt number (Sc), and Sh=F (Sc, Re), where Re=uL/v(=$\omega^2$/v), Sc=v/D, Sh=kL/D, L is the representative length, u is the velocity, D is the diffusion coefficient, k is the mass transfer coefficient, v is the dynamic viscosity, and $\omega$ is the rotational number. Preferred polishing conditions used in the invention include at least Re number in the range of 10 to 10$^5$ and Sh(Sc)$^{1/3}$ in the range of 10 to 4,000. Appropriate flow rate during the polishing ranges from the laminar flow region to the turbulent region. Under the polishing conditions of Re greater than 10$^5$, a thick polishing solution film is formed between the polishing pad and the metal surface, in which case film acts as a lubricant. Moreover, such a polishing condition gives severe loads to the apparatus, and hence such a situation must be possibly avoided. Accordingly, the optimum rotational number of the pad ranges from 1 to 5,000 rpm, especially 3 to 3,000 rpm. In addition, the optimum feed speed of the solution ranges 5 to 1,000 ml/min, especially 10 to 800 ml/min.

Of the present polishing conditions, the polishing pressure range is typically from 10 to 1,000 g/cm$^2$, preferably 10 to 500 g/cm$^2$. Under the polishing pressure below 10 g/cm$^2$, mechanical polishing action cannot be effectively displayed. Under the polishing pressure in excess of 1,000 g/cm$^2$, a high shear stress is applied to the polished substrate so that the substrate may be deformed. Therefore, formation of the planarized surface with uniform thickness becomes more difficult. In addition, such a higher polishing pressure is not economical because the polishing machine leads to the sturdy and large structure. The whole thickness of the substrate to be polished is susceptible to the polishing pressure. To polish substrate surface of at least about 100 μm in thickness, a polishing pressure in the previous range is preferred.

Furthermore, the polishing pressure relates to an increase in surface temperature. The friction produced between the metal surface and the polishing pad raises the temperature. The polishing solution is usually held at a temperature of 20 to 60° C., preferably 30 to 50° C. Polishing in those temperature range does not generate pitting corrosion. Consequently, the thickness of substrate metal can be processed with the surface planarized and results in the variation on the order of several micron meters. The chemical etching rate falls off at solution temperature below 20° C., and then removal rate decreases during the CMP. To improve the previous problems, although high polishing pressure may be applied to the polished surface to increase the solution temperature, such a pressure is irrelevant from the reason for deforming the substrate. When the polishing is performed at temperature above 60° C., pitting corrosion occurs with chemical etching proceeding. Therefore, the surface cannot be planarized, and variation in thickness cannot be always controlled on the order of several micron meters.

A polishing machine used in the present invention has constituents of the following motion. A substrate is fixed on a polishing platform, and a polishing pad with which a polishing head is equipped touches the polished substrate under a set pressure. Moreover, with rotating the pad, the polishing head itself is transferred on the substrate surface. The surface area ratio of the polishing pad to the substrate, 5/1 to 1/5, becomes optimum. When the area of the polishing pad is significantly smaller than that of the substrate, the polishing machine that is equipped with plural polishing heads is applicable efficiently.

Figure 1:
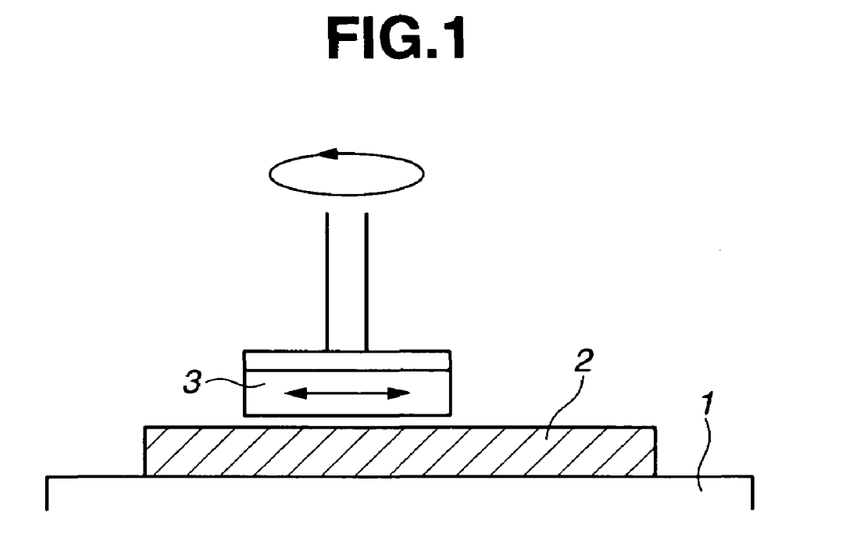
FIG. 1 shows a polishing method with one embodiment of the invention.

FIG. 1 schematically illustrates an example of a polishing machine with a plane pad. The number shown in FIG. 1 denotes a polishing platform 1, a polished substrate 2, and a polishing pad 3. The polishing pad 3 presses on the substrate surface 2 with the pad rotating, and then the polishing proceeds. Instead of rotational motion, the pad 3 can be shuttled.

Figure 2:
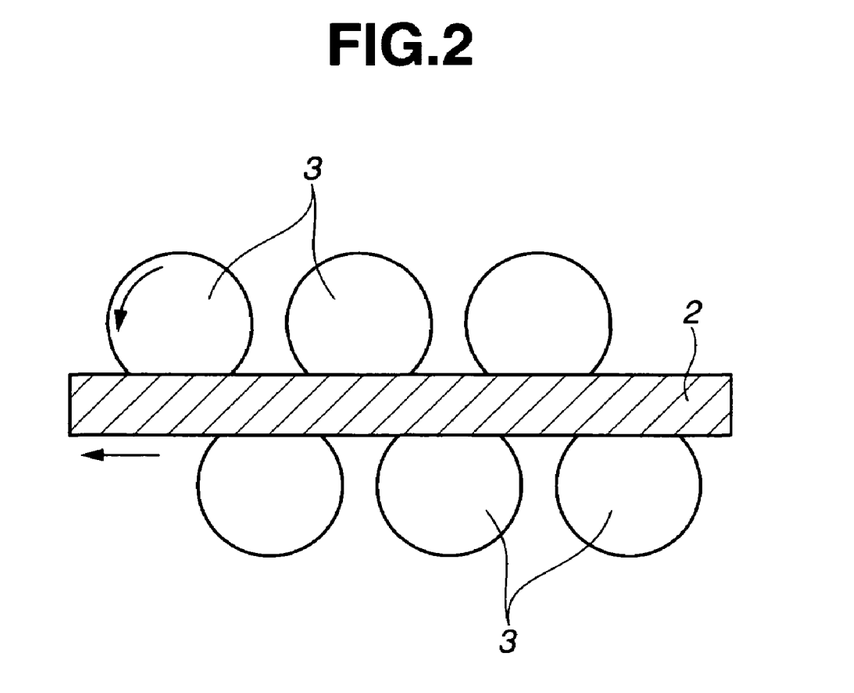
FIG. 2 illustrates a polishing method with another embodiment of the invention.

As shown in FIG. 2, cylindrical-shaped polishing pads are set up and down, and those pads 3 are rotated. In addition, a polished substrate 2 is transferred from one side to another side. The cylindrical-shaped polishing pad presses on the substrate surface under a set pressure, and the chemical mechanical polishing (CMP) can be performed (FIG. 2). In this case, the polishing solution is sprayed with jet nozzles on the substrate surface.

The film thickness to be polished by the inventive method is typically in the range of 1 to 200 μm, and especially 1 to 100 μm.

EXAMPLE

Below are Examples and Comparative Examples. The present invention is explained concretely but is not necessarily restricted to the following examples. Unit shown in the examples is as follows: "parts" denotes "parts by weight", and "% (percents)" denotes "percentages by weight".

Example 1

0.1 M copper (II) sulfate, 0.05 M copper (I) chloride and 0.05 M sodium chloride were dissolved in deionized water to prepare the polishing solution containing 0.15 M copper ions and 0.15 M chloride ions, respectively, at Cu/Cl molar ratio of 1. The solution was adjusted to pH 1.5 with sulfuric acid, which denotes Polishing solution A. $Al_2O_3$ (alpha-conversion 98%, averaged particle diameter of 0.1 μm) of 40 parts was mixed with deionized water of 60 parts, and the mixture was adjusted to pH 1.5. The $Al_2O_3$ was dispersed into the mixture with Disper at 1,200 rpm for 1 h to prepare the slurry paste. The Polishing solution A of 66.7 parts was mixed with the slurry paste of 33.3 parts to form a polishing solution. Consequently, the prepared polishing solution, denoting Solution 1, has slurry concentration of 13.3% and Cu/Cl molar ratio of 1. The Polishing solution A of 66.7 parts was mixed with deionized water (adjusted to pH 1.5) of 33.3 parts to provide anther solution (Solution 2).

By using plane-type polishing machine, the copper film plated on stainless steel substrate (with 50 μm in thickness) and the film of copper-zinc alloy on stainless steel substrate (with 30 μm in thickness) was polished. The polishing conditions were as follows: polishing time 2 min, polishing pressure 100 g/cm$^2$, rotational number 150 rpm, and solution temperature 35° C. The obtained results are shown in Table 1. The resultant removal rate was estimated from the weight variation. The film thickness distribution was determined by X-ray fluorescence analysis. High removal rate was obtained and the polished precision of the films after the CMP is satisfactory to the present invention.

Example 2

Using copper (II) sulfate and sodium chloride, Solution 2-1 to 2-4 were prepared, which had copper and chloride ionic concentrations shown in Table 2. Imidazole was added as a corrosion inhibitor. Furthermore, using copper (II) sulfate and sodium chloride, Solution 2-5 to 2-7 were prepared, as shown in Table 2. Sample 2-8 was only deionized water. Those solution pHs were adjusted with sulfuric acid. The solutions were used to polish copper plates. The polishing machine which was equipped with abrasives-supported nylon nonwoven fabric pad was used. The apparatus was operated under conditions as follows: polishing time 2 min, polishing pressure 100 g/cm$^2$, rotational number 250 rpm, and temperature 35° C. The polishing solutions had dissolved oxygen concentration of 10 mg/L. Such polishing conditions gave Re=95,000 and $Sh(Sc)^{1/3}$=about 350. From the results of Solution 2-1 to 2-4, the removal rate of 1 μm/min or more was obtained, and the polished precision after the CMP is satisfactory to the present invention. From the results of Solution 2-5 to 2-8, the removal rate resulted in 0.1 μm/min, and the precision in thickness distribution was unsatisfactory.

TABLE 1

| Pad type | Polishing properties | Liquid sample 1 | | Liquid sample 2 | |
|---|---|---|---|---|---|
| | | Copper | Copper-zinc alloy | Copper | Copper-zinc alloy |
| Wool felt | Removal rate (μm/min) | 2.35 | 3.69 | 0.32 | 0.83 |
| | Film thickness distribution (μm) | 45 ± 1.5 | 22 ± 1.7 | 49 ± 1.4 | 28 ± 1.3 |
| Abrasives-supported nylon nonwoven fabric* | Removal rate (μm/min) | 5.71 | 6.29 | 3.94 | 5.81 |
| | Film thickness distribution (μm) | 38 ± 1.5 | 18 ± 1.7 | 42 ± 0.5 | 18 ± 0.7 |

*Abrasives: $Al_2O_3$ 14 μm (electric resistance method, JIS R6001)

TABLE 2

| Component concentration and properties | Example 2 | | | | Comparative Example | | | |
|---|---|---|---|---|---|---|---|---|
| | 2-1 | 2-2 | 2-3 | 2-4 | 2-5 | 2-6 | 2-7 | 2-8 |
| Copper ion concentration (M) | 0.02 | 0.05 | 0.70 | 1.00 | 0 | 0.0005 | 0.7 | 0 |
| Chloride ion concentration (M) | 0.10 | 0.10 | 0.10 | 0.10 | 0.10 | 0.001 | 0 | 0 |
| Cu/Cl molar ratio | 0.2 | 0.5 | 7 | 10 | 0 | 0.5 | — | — |
| PH | 1.5 | 1.5 | 1.5 | 1.5 | 1.5 | 1.5 | 1.5 | 1.5 |
| Imidazole (wt %) | 0.01 | 0.01 | 0.01 | 0.01 | 0 | 0 | 0 | 0 |
| Removal rate (μm/min) | 2.6 | 3.8 | 4.2 | 4.9 | 0.1 | 0.1 | 0.1 | 0.1 |
| Film thickness distribution deviation (%) | <5 | <5 | <5 | <5 | <10 | <10 | <10 | <10 |
| Remarks | | | | | | | | Deionized water |

Example 3

Figure 3:
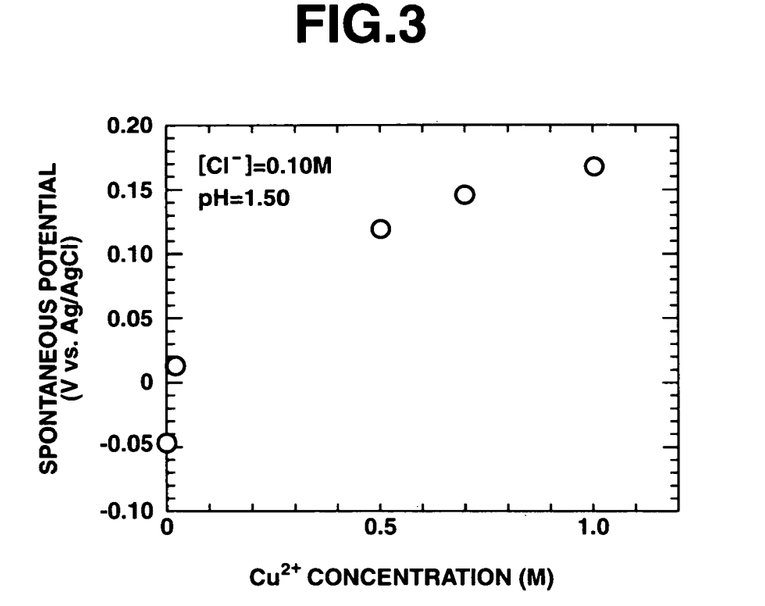
FIG. 3 gives dependence of copper ionic concentration on the rest potential.

Polishing solutions at different copper concentrations were prepared, using copper (II) sulfate and potassium chloride. Rest potential was measured in those solutions (FIG. 3). In Cu/Cl molar ratio range shown in Example 2, the rest potential was stable in the presence of copper ions. The results obtained from the chemical mechanical polishing process exhibited constant removal rate corresponding to the molar ratio.

Example 4

Figure 4:
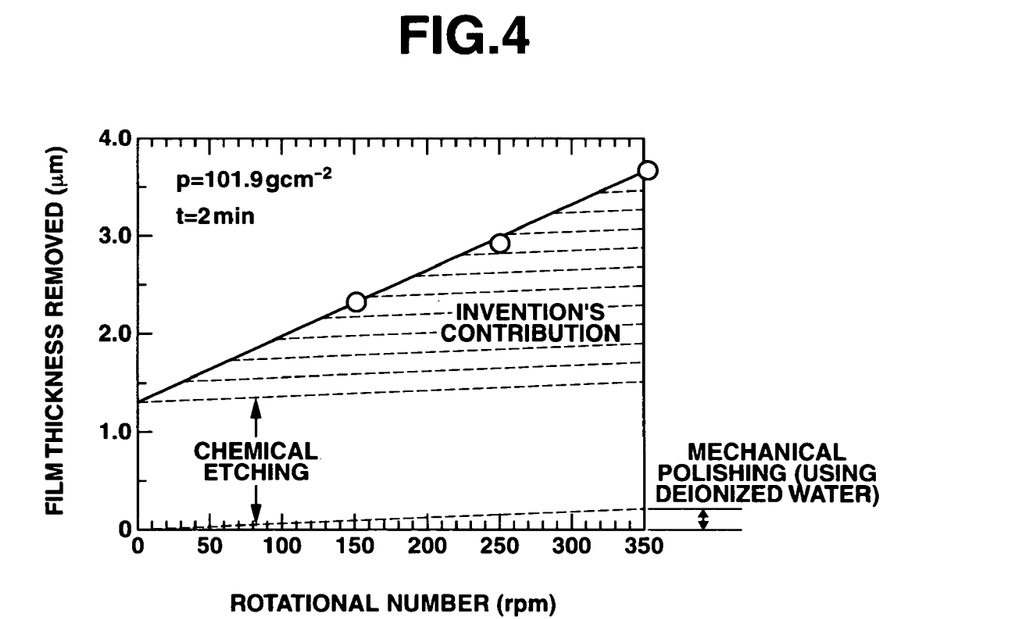
FIG. 4 mentions dependence of rotational number on removal thickness.

Copper plates were polished with using the polishing solution of Solution 2-3 and abrasives-supported nylon pad. The results are shown in FIG. 4. The dotted line corresponds to the data of deionized water obtained from the same polishing conditions. As rotational number was increased, the removal mass increased. Therefore, the CMP was confirmed as mass transfer phenomena.

As shown in FIG. 4, the CMP phenomenon creates interaction between the chemical and the mechanical action; the removal mass for copper substrate is increased.

Example 5

Figure 5:
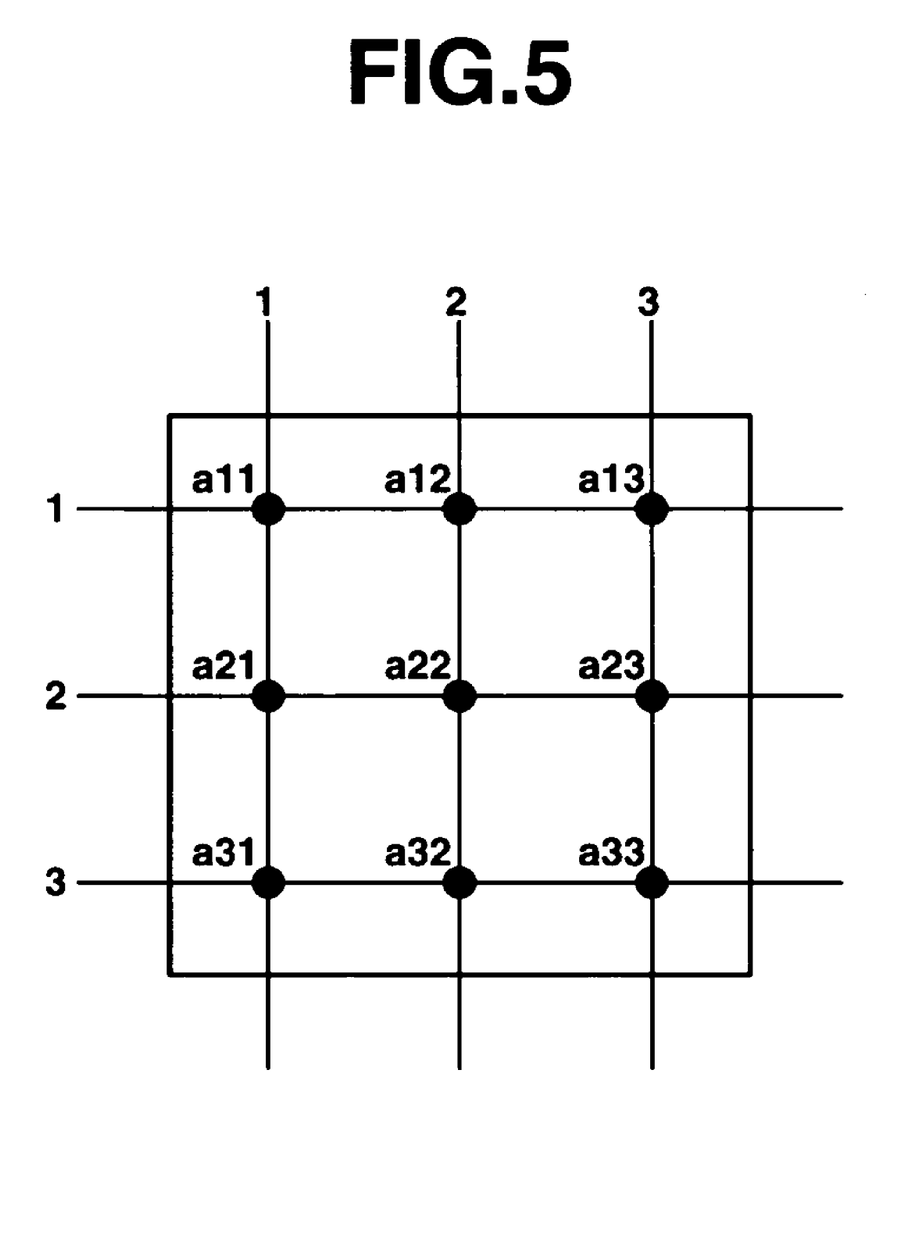
FIG. 5 displays the measurement positions of film thickness.

With using the polishing solution of Solution 2-1, copper-plated printed circuit board was polished under the same condition as described in Example 2. During the CMP, the copper film of about 3.5 μm was polished. Thickness distribution in the copper film before and after the polishing was measured by X-ray fluorescence analysis. The measurement positions are shown in FIG. 5, and the thickness distribution is listed in Table 3. Compared with the thickness distribution in the copper film before the polishing, the thickness distribution after polishing became uniform, and the obtained results reached the desired accuracy.

TABLE 3

| | | Film thickness (μm) | | | | | |
|---|---|---|---|---|---|---|---|
| | | Position | | | | | |
| | | 1 | | 2 | | 3 | |
| | | Before polishing | After polishing | Before polishing | After polishing | Before polishing | After polishing |
| Row position | 1 | 17.98 | 14.28 | 18.44 | 14.08 | 18.19 | 14.65 |
| | 2 | 18.37 | 15.04 | 18.70 | 14.72 | 18.97 | 15.14 |
| | 3 | 18.00 | 14.64 | 17.68 | 14.09 | 17.45 | 14.04 |

Average removal thickness: 3.68 μm (measured by X-ray fluorescence analysis)
Removal thickness: 3.61 μm (measured by gravimetric measurement)

Japanese Patent Application No. 2003-424726 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A polishing solution for a substrate surface composed of a nonferrous metal material comprising mono- and/or di-valent copper ions and chloride ions in the Cu/Cl molar ratio range of $10^{-1}$ to $10^3$, and having a pH of 0.5 to 10.

2. The polishing solution of claim 1, further comprising free-abrasives dispersed therein.

3. The polishing solution of claim 2, wherein the free-abrasives dispersed therein have an averaged particle size in the range of 0.01 to 50 μm in diameter and have a concentration in the polishing solution in a range of from 1 to 50% by weight.

4. The polishing solution of claim 2, wherein the free-abrasives dispersed therein are selected from the group consisting of $Al_2O^3$, $SiO^2$, composites of oxides of $Al_2O_3$ and $SiO_2$, SiC, Zirconia, Selenium Oxide, Diamond Slurry and mixtures thereof.

5. The polishing solution of claim 1, further comprising a corrosion inhibitor is added.

6. The polishing solution of claim 5, wherein the corrosion inhibitor is at least one selected from group consisting of alkylamines with 8 to 12 carbon atoms ($C_nH_{2n-1}NR2$ wherein R is H, OH and/or $CH_3$), alkenylamines with 3 to 4 carbon atoms such as $CH_2{=}CHCH_2CH_2NH_2$ and $CH_3CH{=}CHCH_2NH_2$, aniline derivatives, aniline, hydroxyaniline, hydrazine, hydrazine derivatives, benzotriazole derivatives, benzotriazole, 5-benzyl-1, 4-triazole-3-thion, quinoline derivatives, quinoline, isoquinoline, nitroquinoline, hydroxyquinoline, indole, indole derivatives, imidazole derivatives, imidazole, 2-mercaptanbenzimidazole, thiocarbon derivatives, thiourea, furan derivatives, furan, hydroxyfuran, pyrrole derivatives, pyrrole, nitropyrrole, hydroxypyrrole, phenol derivatives, methylphenol, nitrophenol, monosaccharides, glucose and fructose.

7. The polishing solution of claim 1, which is used in a polishing method to press a polishing pad against the substrate surface.

8. The polishing solution of claim 7, wherein the polishing method includes the steps of setting the polishing pad on a polishing machine capable of a rotational or reciprocating motion and supplying a polishing solution to the polishing pad or the substrate before pressing the polishing pad against the substrate surface.

9. The polishing solution of claim 1, wherein the nonferrous material is copper or a copper alloy.

10. The polishing solution of claim 1, wherein the nonferrous material is a Cu-Zn alloy or a Cu-Sn alloy.

11. The polishing solution of claim 1, wherein the CU/Cl molar ratio is in the range of $10^{-1}$ to $10^2$.

12. The polishing solution of claim 1, further comprising an oxidizing agent.

13. A method of polishing a nonferrous metal material comprising supplying a polishing solution containing mono- and/or di-valent copper ions and chloride ions in the Cu/Cl molar ratio range of $10^{-1}$ to a polishing pad or a substrate made of the nonferrous metal material and then pressing the polishing pad on the substrate, thereby polishing a surface of the substrate by a mechanical polishing of the polishing pad and a dissolution of the polishing solution.

14. The polishing method of claim 13, wherein the substrate is polished using the polishing pad set on a polishing machine capable of a rotational or reciprocating motion with the polishing solution supplied to the polishing pad or the substrate.

15. The polishing method of claim 13, wherein the polishing pad has a Young modulus of 5 to 100 g/cm² and a tensile strength of 10 kg/cm² or less.

16. The polishing method of claim 13, wherein the substrate is polished using the polishing pad having porous surface or orthogonal surface trench.

17. The polishing method of claim 13, wherein the substrate is polished by the polishing pad rotated at a speed of 1 to 5,000 rpm.

18. The polishing method of claim 13, wherein the substrate is polished under a polishing pressure of 10 to 1,000 g/cm².

19. The polishing method of claim 13, wherein the substrate is polished using the polishing pad supporting abrasive particles.

20. The polishing method of claim 13, wherein the substrate is polished using the polishing solution having abrasives dispersed therein as a slurry.

* * * * *